United States Patent
Alfassy et al.

(10) Patent No.: US 12,475,692 B2
(45) Date of Patent: Nov. 18, 2025

(54) TRAINING MULTI-MODAL MODELS ON DOCUMENTS USING MULTIPLE INSTANCE LEARNING

(71) Applicant: International Business Machines Corporation, Armonk, NY (US)

(72) Inventors: Amit Alfassy, Haifa (IL); Assaf Arbelle, Lehvot Haviva (IL); Leonid Karlinsky, Acton, MA (US)

(73) Assignee: International Business Machines Corporation, Armonk, NY (US)

(*) Notice: Subject to any disclaimer, the term of this patent is extended or adjusted under 35 U.S.C. 154(b) by 331 days.

(21) Appl. No.: 18/306,071

(22) Filed: Apr. 24, 2023

(65) Prior Publication Data

US 2024/0355104 A1 Oct. 24, 2024

(51) Int. Cl.
*G06V 10/80* (2022.01)
*G06V 10/774* (2022.01)
*G06V 10/82* (2022.01)
*G06V 20/62* (2022.01)
*G06V 30/41* (2022.01)

(52) U.S. Cl.
CPC .......... *G06V 10/803* (2022.01); *G06V 10/774* (2022.01); *G06V 10/82* (2022.01); *G06V 20/62* (2022.01); *G06V 30/41* (2022.01)

(58) Field of Classification Search
CPC .... G06V 10/803; G06V 10/774; G06V 10/82; G06V 20/62; G06V 30/41; G06V 30/19173
See application file for complete search history.

(56) References Cited

U.S. PATENT DOCUMENTS

| | | | |
|---|---|---|---|
| 9,807,473 B2 | 10/2017 | Mei et al. | |
| 10,360,631 B1* | 7/2019 | Jezewski | G06Q 40/06 |
| 2014/0079297 A1* | 3/2014 | Tadayon | G06V 40/172 |
| | | | 382/118 |
| 2017/0193545 A1* | 7/2017 | Zhou | G06Q 30/0254 |
| 2019/0147320 A1* | 5/2019 | Mattyus | G06V 20/182 |
| | | | 382/155 |
| 2023/0153522 A1* | 5/2023 | Cho | G06F 18/214 |
| | | | 382/159 |
| 2023/0161808 A1* | 5/2023 | Bursztyn | G06F 16/53 |
| | | | 707/772 |
| 2023/0196716 A1* | 6/2023 | Feng | G06V 10/806 |
| | | | 382/209 |

(Continued)

OTHER PUBLICATIONS

X-CLIP: End-to-End Multi-grained Contrastive Learning for Video-Text Retrieval, Ma et al. (Year: 2022).*

(Continued)

*Primary Examiner* — Qun Shen
(74) *Attorney, Agent, or Firm* — Randy Tejeda

(57) ABSTRACT

An example system includes a processor to automatically extract text and images from a document. The processor can automatically generate text bags including a number of nearest texts for each of the extracted images. The processor can then train a multi-modal model based on the automatically generated text bags using a CLIP-MIL loss that computes, for each of the extracted images, a correlation between each of the different texts in the texts bags using a CLIP feature space at each gradient step of the gradient descent-based multiple instance learning (MIL) algorithm.

19 Claims, 12 Drawing Sheets

(56) References Cited

U.S. PATENT DOCUMENTS

| | | | |
|---|---|---|---|
| 2023/0259787 A1* | 8/2023 | David | G06N 3/0455 706/15 |
| 2023/0298224 A1* | 9/2023 | Aggarwal | G06F 16/5838 382/162 |
| 2024/0160917 A1* | 5/2024 | Xue | G06V 10/776 |

OTHER PUBLICATIONS

LORA: Low-RANK Adaptation of Large Language Models, Hu et al. (Year: 2021).*

Chao Jia, et al., "Scaling Up Visual and Vision-Language Representation Learning With Noisy Text Supervision", Published In: arXiv, Jun. 11, 2021, 14 pages.

Edward Hu, et al., "LoRA: Low-Rank Adaptation of Large Language Models", Published In ArXiv, Oct. 16, 2021, 26 pages.

Hanoona Rasheed, et al., "Fine-tuned CLIP Models are Efficient Video Learners", Published In ArXiv, Dec. 6, 2022, 13 pages.

Hongwei Xue, et al., "CLIP-ViP: Adapting Pre-trained Image-Text Model to Video-Language Representation Alignment", Published In ArXiv, Sep. 23, 2022, 11 pages.

Huansha Wang, et al., Research Progress on Vision-Language Multimodal Pretraining Technology, Published in MDPI, Oct. 31, 2022, 25 pages.

Thien-Tri Cao, et al., "HCMUS at MediaEval 2021: Fine-tuning CLIP for Automatic News-Images Re-Matching", Published CEUR, Dec. 13-15, 2021, 2 pages.

Weijie Su, et al., "VL-BERT: Pre-Training of Generic Visual-Linguistic Representations", Published In: arXiv, Feb. 18, 2020, 16 pages.

Miech et al. "End-to-End Learning of Visual Representations from Uncurated Instructional Videos", arXiv:1912.06430, Dec. 13, 2019, 14 pages, https://doi.org/10.48550/arXiv.1912.06430.

Radford et al. "Learning Transferable Visual Models From Natural Language Supervision", arXiv:2103.00020, Feb. 26, 2021, 47 pages, https://doi.org/10.48550/arXiv.2103.00020.

Wang et al., "Learning Deep Structure-Preserving Image-Text Embeddings", arXiv:1511.06078v2 [cs.CV], Apr. 14, 2016, 9 pages.

Yao et al., "FILIP: Fine-grained Interactive Language-image Pre-training", arXiv:2111.07783v1 [cs.CV], Nov. 9, 2021, 18 pages.

Ye et al., "Cap2Det: Learning to Amplify Weak Caption Supervision for Object Detection", arXiv:1907.10164v3 [cs.CV], Aug. 16, 2019, 17 pages.

Yu et al., "Coca: Contrastive captioners are image-text foundation models", arXiv:2205.01917v2 [cs.CV], Jun. 14, 2022, 19 pages.

Yuan et al., "Florence: A new foundation model for computer vision", arXiv:2111.11432v1 [cs.CV], Nov. 22, 2021, 17 pages.

Zhai et al., "LiT : Zero-Shot Transfer with Locked-image text Tuning", arXiv:2111.07991v3 [cs.CV], Jun. 22, 2022, 26 pages.

Zhang et al., "Contrastive Learning of Medical Visual Representations from Paired Images and Text", arXiv:2010.00747v2 [cs.CV], Sep. 19, 2022, 24 pages.

Zhou et al., "Learning Deep Features for Discriminative Localization", arXiv:1512.04150v1 [cs.CV], Dec. 14, 2015, 10 pages.

Alayrac et al., "Flamingo: a Visual Language Model for Few-Shot Learning", arXiv:2204.14198v2 [cs.CV], Nov. 15, 2022, 54 pages.

Alfassy et al., "Feta: Towards specializing foundation models for expert task applications", arXiv:2209.03648v2 [cs.CV], Dec. 19, 2022, 29 pages.

Andrews et al., "Support Vector Machines for Multiple-Instance Learning", Advances in Neural Information Processing Systems 15 (NIPS 2002), Jan. 1, 2002, 8 pages.

Auer et al., "Delivering document conversion as a cloud service with high throughput and responsiveness", arXiv:2206.00785v1 [cs.DL], Jun. 1, 2022, 11 pages.

Bach et al., "DIFFRAC : a discriminative and flexible framework for clustering", NIPS'07: Proceedings of the 21st International Conference on Neural Information Processing System, Dec. 3, 2007, pp. 49-56.

Bojanowski et al., "Finding actors and actions in movies", 2013 IEEE International Conference on Computer Vision, Dec. 2013, pp. 2280-2287.

Bommasani et al., "On the opportunities and risks of foundation models", arXiv:2108.07258v3 [cs.LG], Jul. 12, 2022, 214 pages.

Brown et al., "Language models are few-shot learners", arXiv:2005.14165v4 [cs.CL], Jul. 22, 2020, 75 pages.

Chéron et al., "A flexible model for training action localization with varying levels of supervision", arXiv:1806.11328v2 [cs.CV], Nov. 27, 2018, 17 pages.

Desai et al., "VirTex: Learning Visual Representations from Textual Annotations", arXiv:2006.06666v3 [cs.CV], Sep. 25, 2021, 17 pages.

Devlin et al., "BERT: Pre-training of Deep Bidirectional Transformers for Language Understanding", arXiv:1810.04805v2 [cs.CL], May 24, 2019, 16 pages.

Dietterich et al., "Solving the multiple instance problem with axis-parallel rectangles", Artificial Intelligence, Jan. 1997, pp. 31-71.

Geng et al., "Multimodal masked autoencoders learn transferable representations", arXiv:2205.14204v3 [cs.CV], Oct. 21, 2022, 15 pages.

Github, "mlfoundations / open_clip", available online at <https://web.archive.org/web/20210729164745/https://github.com/mlfoundations/open_clip>, Jul. 29, 2021, 8 pages.

Hinton et al., "Distilling the Knowledge in a Neural Network", arXiv:1503.02531 [stat.ML], Mar. 9, 2015, 9 pages.

Ilse et al., "Attention-based Deep Multiple Instance Learning", arXiv:1802.04712v4 [cs.LG], Jun. 28, 2018, 16 pages.

Jerbi et al., "Learning Object Detection from Captions via Textual Scene Attributes", arXiv:2009.14558v1 [cs.CV], Sep. 30, 2020, 10 pages.

Keeler et al., "Integrated segmentation and recognition of hand-printed numerals", NIPS-3: Proceedings of the 1990 conference on Advances in neural information processing systems 3, Oct. 1, 1990, pp. 557-563.

Kim et al., "Vilt: Vision-and-language transformer without convolution or region supervision", arXiv:2102.03334v2 [stat.ML], Jun. 10, 2021, 12 pages.

Kiros et al., "Unifying Visual-Semantic Embeddings with Multimodal Neural Language Models", arXiv:1411.2539v1 [cs.LG], Nov. 10, 2014, 13 pages.

Leung et al., "Handling Label Noise in Video Classification via Multiple Instance Learning", ICCV '11: Proceedings of the 2011 International Conference on Computer Vision, Nov. 6, 2011, pp. 2056-2063.

Li et al., Align before Fuse: Vision and Language Representation Learning with Momentum Distillation, arXiv:2107.07651v2 [cs.CV], Oct. 7, 2021, 16 pages.

Li et al., "BLIP: Bootstrapping Language-Image Pre-training for Unified Vision-Language Understanding and Generation", arXiv:2201.12086v2 [cs.CV], Feb. 15, 2022.

Li et al., "Supervision Exists Everywhere: A Data Efficient Contrastive Language-image Pre-training Paradigm", arXiv:2110.05208v2 [cs.CV], Mar. 14, 2022.

Livathinos et al., "Robust pdf document conversion using recurrent neural networks", arXiv:2102.09395v1 [cs.LG], Feb. 18, 2021, 9 pages.

Lu et al., "Vilbert: Pretraining task-agnostic visiolinguistic representations for vision-and-language tasks", arXiv:1908.02265v1 [cs.CV], Aug. 6, 2019, 11 pages.

Maron et al., "A framework for multiple-instance learning", NIPS '97: Proceedings of the 1997 conference on Advances in neural information processing systems 10, Jul. 31, 1998, pp. 570-576.

Miech et al., "HowTo100M: Learning a Text-Video Embedding by Watching Hundred Million Narrated Video Clips", arXiv:1906.03327v2 [cs.CV], Jul. 31, 2019, 14 pages.

Miech et al., "Learning from Video and Text via Large-Scale Discriminative Clustering", arXiv:1707.09074v1 [cs.CV], Jul. 27, 2017, 12 pages.

Nassar et al., "TableFormer: Table Structure Understanding with Transformers", arXiv:2203.01017v2 [cs.CV], Mar. 11, 2022, 16 pages.

(56) References Cited

OTHER PUBLICATIONS

Nichol et al., "GLIDE: Towards Photorealistic Image Generation and Editing with Text-Guided Diffusion Models", arXiv:2112.10741v3 [cs.CV], Mar. 8, 2022, 20 pages.

No Author, "Deep Search Toolkit", https://web.archive.org/web/20220714170549/https://github.com/DS4SD/deepsearch-toolkit, Jul. 14, 2022, 3 pages.

No Author, "East Automotive Archives", https://web.archive.org/web/20230307201157/https://www.workshopservicemanual.com/, Mar. 7, 2023, 1 page.

No. Author, "OpenCLIP", https://web.archive.org/web/20210729164745/https://github.com/mlfoundations/open_clip, dated Jun. 13, 2016, 8 pages.

Oquab et al., "Is object localization for free?—Weakly-supervised learning with convolutional neural networks", 2015 IEEE Conference on Computer Vision and Pattern Recognition (CVPR), Jun. 2015, 10 pages.

Pfitzmann et al., "DocLayNet: A Large Human-Annotated Dataset for Document-Layout Analysis", arXiv:2206.01062v1 [cs.CV], Jun. 2, 2022, 9 pages.

Quellec et al., "Multiple-Instance Learning for Medical Image and Video Analysis", IEEE Reviews in Biomedical Engineering, Jan. 10, 2017, pp. 213-234.

Raffel et al., "Exploring the Limits of Transfer Learning with a Unified Text-to-Text Transformer", arXiv:1910.10683v4 [cs.LG], Sep. 19, 2023, 67 pages.

Ramesh et al., "Zero-shot text-to-image generation", arXiv:2102.12092v2 [cs.CV], Feb. 26, 2021, 20 pages.

Reed et al., "A generalist agent", arXiv:2205.06175v3 [cs.AI], Nov. 11, 2022, 42 pages.

Saharia et al., "Photorealistic Text-to-Image Diffusion Models with Deep Language Understanding", arXiv:2205.11487v1 [cs.CV], May 23, 2022, 46 pages.

Schuhmann et al., "LAION-400M: Open Dataset of CLIP-Filtered 400 Million Image-Text Pairs", arXiv:2111.02114v1 [cs.CV], Nov. 3, 2021, 5 pages.

Shapovalova et al., "Similarity Constrained Latent Support Vector Machine: An Application to Weakly Supervised Action Classification", ECCV'12: Proceedings of the 12th European conference on Computer Vision—vol. Part VII, Oct. 7, 2012, pp. 55-68.

Singh et al., "Flava: A foundational language and vision alignment model", arXiv:2112.04482v3 [cs.CV], Mar. 29, 2022, 17 pages.

Sirinukunwattana et al., "Locality Sensitive Deep Learning for Detection and Classification of Nuclei in Routine Colon Cancer Histology Images", IEEE Transactions on Medical Imaging, Feb. 4, 2016, pp. 1196-1206.

Staar et al., "Corpus Conversion Service: A Machine Learning Platform to Ingest Documents at Scale", KDD '18: Proceedings of the 24th ACM SIGKDD International Conference on Knowledge Discovery & Data Mining, Jul. 19, 2018, pp. 774-782.

Sun et al., "Videobert: A joint model for video and language representation learning", arXiv:1904.01766v2 [cs.CV], Sep. 11, 2019, 13 pages.

Thrush et al., "Winoground: Probing Vision and Language Models for Visio-Linguistic Compositionality", arXiv:2204.03162v2 [cs.CV], Apr. 22, 2022, 18 pages.

Tishby et al., "Deep Learning and the Information Bottleneck Principle", arXiv:1503.02406v1 [cs.LG], Mar. 9, 2015, 5 pages.

Vendrov et al., "Order-embeddings of Images and Language", arXiv:1511.06361v6 [cs.LG], Mar. 1, 2016, 12 pages.

\* cited by examiner

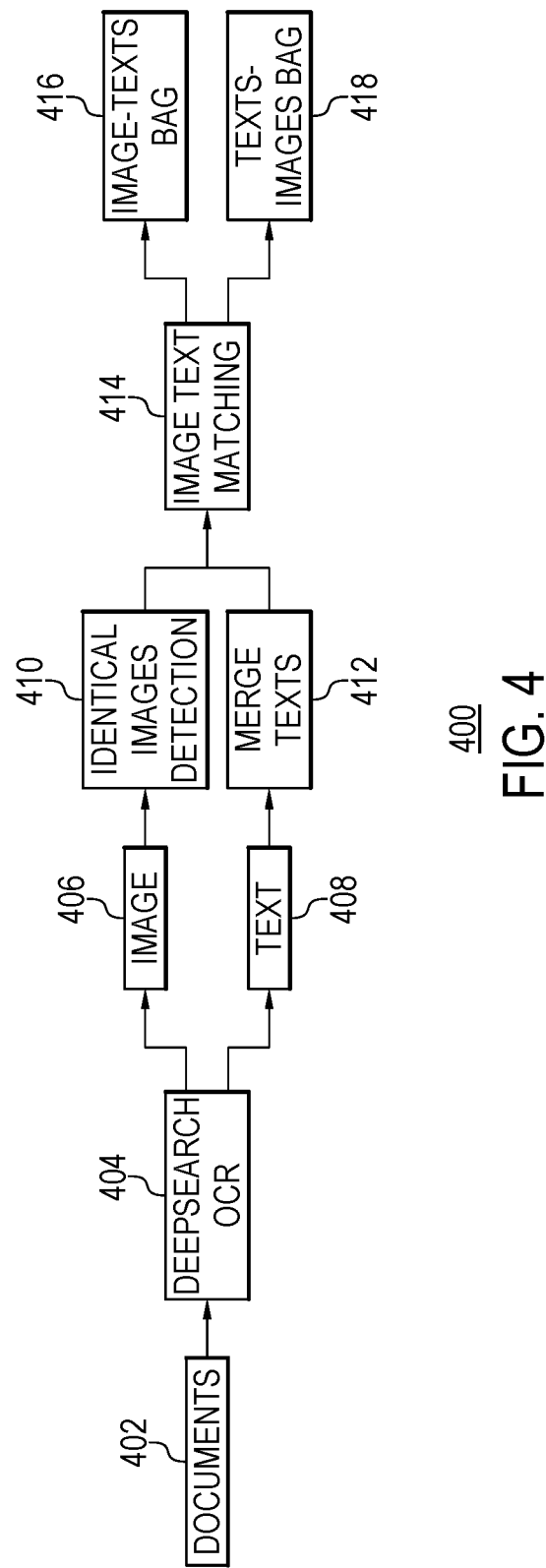

|  | Name | Locked | Image-to-Text | | | Text-to-Image | | |
|---|---|---|---|---|---|---|---|---|
|  |  |  | Rec@1 | Rec@5 | Rec@10 | Rec@1 | Rec@5 | Rec@10 |
| Zero-Shot | CLIP |  | 9.7% | 26.6% | 38.1% | 10.1% | 26.7% | 39.5% |
|  | FLAVA |  | 4.0% | 16.6% | 29.7% | 5.5% | 19.8% | 34.5% |
|  | ViLT |  | 2.9% | 11.5% | 22.0% | 3.5% | 14.3% | 26.7% |
|  | ALBEF |  | 3.9% | 16.6% | 26.7% | 4.4% | 18.4% | 31.2% |
|  | Concatenate | ✓ | 9.4% | 25.0% | 36.7% | 8.1% | 24.0% | 37.6% |
|  | Choose-One | ✓ | 10.40% | 26.7% | 39.3% | 9.20% | 25.6% | 37.9% |
|  | CLIP-MIL | ✓ | 11.0% | 29.2% | 40.0% | 9.7% | 40.6% | 11.0% |
| One-Shot | CLIP |  | 9.7% | 26.6% | 38.1% | 10.1% | 26.7% | 39.4% |
|  | FLAVA |  | 4.0% | 16.6% | 29.7% | 5.5% | 19.8% | 34.5% |
|  | ViLT |  | 2.9% | 11.5% | 22.0% | 3.5% | 14.3% | 26.7% |
|  | ALBEF |  | 3.9% | 16.6% | 26.7% | 4.4% | 18.4% | 31.2% |
|  | Concatenate | ✓ | 8.7% | 24.4% | 37.0% | 7.9% | 25.1% | 38.5% |
|  | Choose-One | ✓ | 10.4% | 28.0% | 39.9% | 8.9% | 25.5% | 37.9% |
|  | CLIP-MIL | ✓ | 11.9% | 30.3% | 42.5% | 10.9% | 29.4% | 43.2% |
| Few-Shot | CLIP |  | 8.6% | 25.6% | 37.2% | 9.2% | 24.3% | 36.5% |
|  | FLAVA |  | 3.9% | 16.7% | 30.1% | 5.2% | 18.5% | 32.7% |
|  | ViLT |  | 2.8% | 11.1% | 21.6% | 3.2% | 13.3% | 25.4% |
|  | ALBEF |  | 3.9% | 13.1% | 25.5% | 4.2% | 17.4% | 29.6% |
|  | Concatenate | ✓ | 8.4% | 24.5% | 38.5% | 10.5% | 29.0% | 41.8% |
|  | Choose-One | ✓ | 11.6% | 31.5% | 44.7% | 11.6% | 29.0% | 44.0% |
|  | CLIP-MIL | ✓ | 13.8% | 33.7% | 47.5% | 11.6% | 33.0% | 47.0% |
| Many-Shot | CLIP |  | 13.8% | 31.2% | 41.6% | 13.6% | 36.4% | 50.7% |
|  | FLAVA |  | 4.2% | 16.1% | 27.8% | 6.6% | 24.4% | 41.0% |
|  | ViLT |  | 3.1% | 13.3% | 23.4% | 4.4% | 18.3% | 32.0% |
|  | ALBEF |  | 3.8% | 15.8% | 26.6% | 5.5% | 22.4% | 37.5% |
|  | Concatenate | ✓ | 20.7% | 39.7% | 51.3% | 16.2% | 41.2% | 56.2% |
|  | Choose-One | ✓ | 27.7% | 52.7% | 64.1% | 21.6% | 52.1% | 66.5% |
|  | CLIP-MIL | ✓ | 34.5% | 56.8% | 66.1% | 27.2% | 57.9% | 70.7% |

| | | | Image-to-Text | | | Text-to-Image | | |
|---|---|---|---|---|---|---|---|---|
| Name | Locked | Rec@1 | Rec@5 | Rec@10 | Rec@1 | Rec@5 | Rec@10 |
| Few-Shot | | | | | | | | |
| CLIP | | 8.6% | 25.6% | 37.2% | 9.2% | 24.3% | 36.6% |
| FLAVA | | 3.9% | 16.7% | 30.1% | 5.2% | 18.5% | 32.7% |
| ViT | | 2.8% | 11.1% | 21.6% | 3.2% | 13.3% | 25.4% |
| ALBEF | | 3.9% | 13.1% | 25.5% | 4.2% | 17.4% | 29.6% |
| CLIP-MIL-SOFTMAX | | 14.6% | 34.4% | 47.5% | 13.4% | 34.7% | 47.8% |
| CLIP-MIL-SOFTMAX | ✓ | 13.4% | 33.5% | 46.6% | 12.2% | 34.1% | 47.8% |
| CLIP-MIL-MAX | | 13.7% | 34.5% | 47.8% | 15.7% | 34.8% | 48.4% |
| CLIP-MIL-MAX | ✓ | 13.5% | 33.9% | 46.4% | 12.3% | 34.7% | 48.5% |
| CLIP-MIL-NCE | | 14.1% | 36.7% | 48.9% | 15.0% | 35.2% | 50.0% |
| CLIP-MIL-NCE | ✓ | 13.8% | 33.7% | 47.5% | 11.6% | 33.0% | 47.0% |
| Many-Shot | | | | | | | | |
| CLIP | | 13.8% | 31.2% | 41.6% | 13.6% | 36.4% | 50.7% |
| FLAVA | | 4.2% | 16.1% | 27.8% | 6.6% | 24.4% | 41.0% |
| ViT | | 3.1% | 13.3% | 23.4% | 4.4% | 18.3% | 32.0% |
| ALBEF | | 3.8% | 15.8% | 26.6% | 5.5% | 22.4% | 37.5% |
| CLIP-MIL-SOFTMAX | | 32.0% | 54.8% | 65.7% | 26.5% | 58.1% | 71.3% |
| CLIP-MIL-SOFTMAX | ✓ | 34.1% | 56.5% | 66.4% | 26.7% | 58.0% | 70.3% |
| CLIP-MIL-MAX | | 34.4% | 56.7% | 66.2% | 27.3% | 57.9% | 71.1% |
| CLIP-MIL-MAX | ✓ | 31.2% | 54.7% | 65.7% | 26.2% | 58.1% | 71.3% |
| CLIP-MIL-NCE | | 32.6% | 56.2% | 66.7% | 27.8% | 59.0% | 72.3% |
| CLIP-MIL-NCE | ✓ | 34.5% | 56.8% | 66.1% | 27.2% | 57.9% | 70.7% |

| Baseline | Locking | Image-to-Text | | | Text-to-Image | | |
| --- | --- | --- | --- | --- | --- | --- | --- |
| | | Rec@1 | Rec@5 | Rec@10 | Rec@1 | Rec@5 | Rec@10 |
| | Unlocked | 32.6% | 56.2% | 66.7% | 27.8% | 59.0% | 72.3% |
| | Locked Image | 34.5% | 56.8% | 66.1% | 27.2% | 57.9% | 70.2% |
| | Locked Text | 30.6% | 54.4% | 64.6% | 27.8% | 59.0% | 71.6% |
| CLIP-MIL | Locked* | 30.1% | 52.4% | 63.1% | 25.0% | 55.7% | 69.1% |
| | CLIP-LoRA r=4 | 33.8% | 57.3% | 67.6% | 28.9% | 61.4% | 74.1% |
| | CLIP-LoRA r=32 | 35.6% | 58.3% | 68.1% | 30.7% | 62.6% | 74.6% |
| | CLIP-LoRA r=256 | 35.5% | 57.7% | 67.8% | 30.8% | 62.4% | 74.4% |

|  |  |  | Image-to-Text | | | Text-to-Image | | |
|---|---|---|---|---|---|---|---|---|
|  | Name | Locked | Rec@1 | Rec@5 | Rec@10 | Rec@1 | Rec@5 | Rec@10 |
| Zero-Shot | CLIP |  | 14.3% | 39.3% | 55.6% | 14.7% | 36.4% | 57.0% |
| Zero-Shot | Concatenate | ✓ | 9.3% | 35.4% | 58.5% | 11.7% | 31.5% | 54.5% |
| Zero-Shot | Choose-One | ✓ | 12.8% | 40.5% | 59.0% | 14.2% | 4.9% | 60.0% |
| Zero-Shot | CLIP-MIL | ✓ | 13.9% | 41.0% | 65.0% | 15.1% | 43.2% | 60.8% |
| One-Shot | CLIP |  | 14.3% | 39.3% | 55.6% | 14.7% | 36.4% | 57.0% |
| One-Shot | Concatenate | ✓ | 12.4% | 37.7% | 54.1% | 13.0% | 35.3% | 54.9% |
| One-Shot | Choose-One | ✓ | 12.4% | 38.8% | 62.5% | 14.2% | 39.5% | 62.1% |
| One-Shot | CLIP-MIL | ✓ | 15.8% | 39.9% | 62.6% | 14.9% | 41.6% | 62.5% |
| Few-Shot | CLIP |  | 12.8% | 37.3% | 51.7% | 12.5% | 32.1% | 53.0% |
| Few-Shot | Concatenate | ✓ | 8.2% | 33.0% | 55.4% | 8.8% | 28.9% | 54.3% |
| Few-Shot | Choose-One | ✓ | 9.8% | 37.0% | 59.5% | 10.1% | 35.7% | 59.7% |
| Few-Shot | CLIP-MIL | ✓ | 12.9% | 38.4% | 60.3% | 13.2% | 38.6% | 61.6% |
| Many-Shot | CLIP |  | 20.0% | 47.2% | 71.36% | 23.7% | 53.4% | 72.9% |
| Many-Shot | Concatenate | ✓ | 29.9% | 61.6% | 81.1% | 28.8% | 56.4% | 76.3% |
| Many-Shot | Choose-One | ✓ | 34.6% | 70.6% | 83.5% | 33.7% | 68.3% | 82.6% |
| Many-Shot | CLIP-MIL | ✓ | 43.0% | 74.8% | 85.7% | 43.5% | 70.2% | 85.3% |

TRAINING MULTI-MODAL MODELS ON DOCUMENTS USING MULTIPLE INSTANCE LEARNING

BACKGROUND

The present techniques relate to training multi-modal models. More specifically, the techniques relate to automatically training multi-modal models using multiple instance learning.

SUMMARY

According to an embodiment described herein, a system can include a processor to automatically extract text and images from a document. The processor can also further automatically generate text bags including a number of nearest texts for each of the extracted images. The processor can also train a multi-modal model based on the automatically generated text bags using a CLIP-MIL loss that computes, for each of the extracted images, a correlation between each of the different texts in the texts bags using a CLIP feature space at each gradient step of the gradient descent-based multiple instance learning (MIL) algorithm.

According to another embodiment described herein, a method can include automatically generating, via a processor, a number of image-texts bags including number of nearest extracted texts for each extracted image from a document. The method can further include fine-tuning, via the processor, an unlocked subset of parameters of a pre-trained multi-modal model based on generated text bags using a CLIP-MIL loss that computes, for each extracted image, a correlation between different texts in texts bags using a CLIP feature space at each gradient step of gradient descent-based multiple instance learning (MIL) algorithm. Pretrained parameters of the pretrained multi-modal model are locked during the fine-tuning.

According to another embodiment described herein, a computer program product for training multi-modal models can include computer-readable storage medium having program code embodied therewith. The program code executable by a processor to cause the processor to automatically generate a number of image-texts bags including a number of nearest extracted texts for each extracted image from a document. The program code can also cause the processor to fine-tune an unlocked subset of parameters of a pretrained multi-modal model based on generated text bags using a CLIP-MIL loss that computes, for each extracted image, a correlation between different texts in texts bags using a CLIP feature space at each gradient step of gradient descent-based multiple instance learning (MIL) algorithm, wherein pretrained parameters of the pretrained multi-modal model are locked during the fine-tuning.

BRIEF DESCRIPTION OF THE SEVERAL VIEWS OF THE DRAWINGS

FIG. 4 is a block diagram of an example system for automatically generating image-text bags from documents;

FIG. 8A is a table of results of various experiments performed with CLIP-MIL to show the performance of CLIP-MIL in general;

FIG. 8B is a table of results of various experiments performed with various CLIP-MIL variants to show the performance of different types of CLIP-MIL;

FIG. 9 is a table of results of various experiments performed with CLIP-LoRA; and FIG. 10 is a table of results of a validation of the techniques described herein performed using manually annotated data.

DETAILED DESCRIPTION

Figure 1:
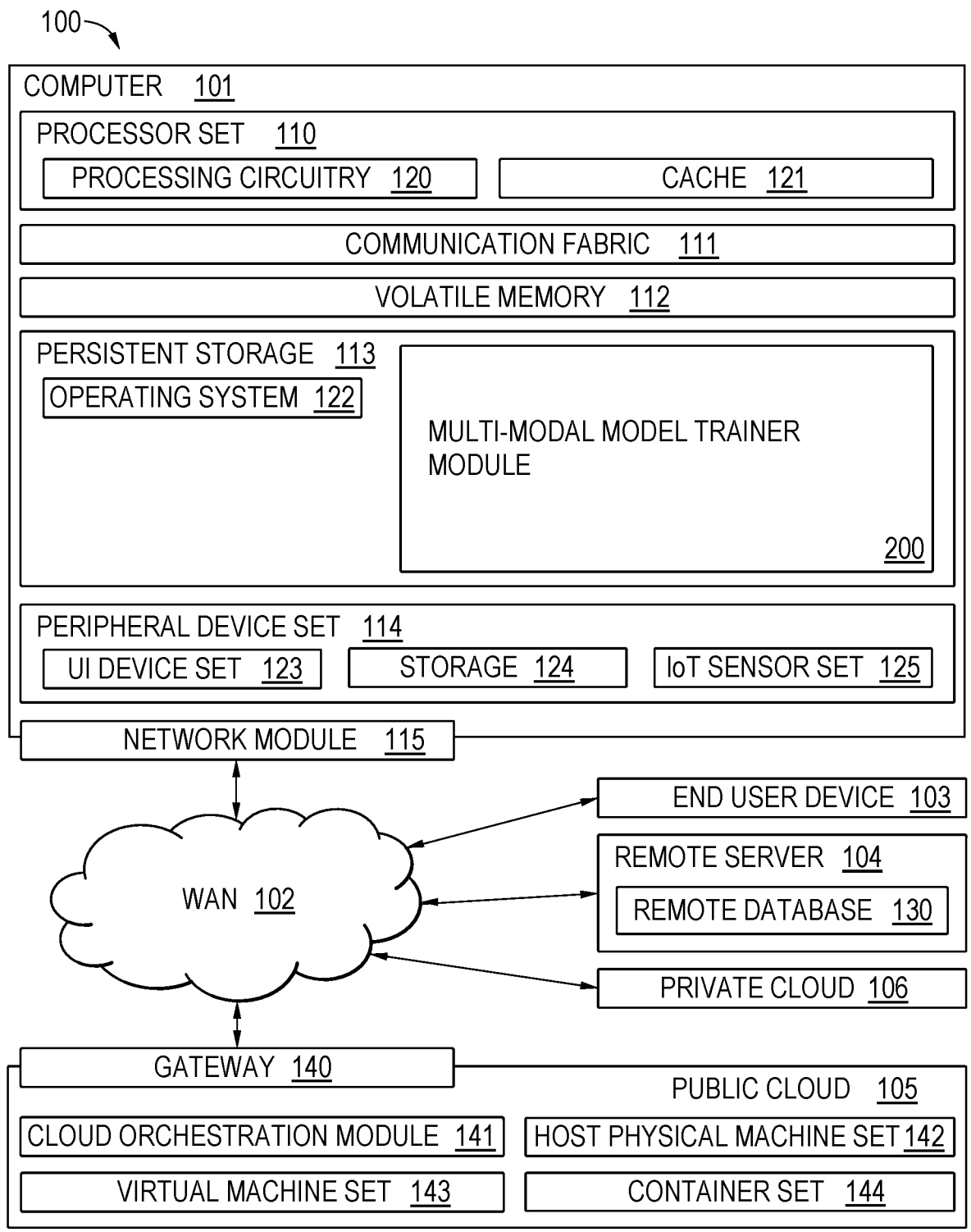
FIG. 1 is a block diagram of an example computing environment that contains an example of an environment for the execution of at least some of the computer code involved in performing the inventive methods, such as a multi-modal model trainer module.

Foundational Models (FMs) are models that acquire abilities going beyond base training objectives through their training on huge amounts of data. FMs are commonly trained using hundreds of millions of data points and a collection of base tasks and may be either uni-modal or multi-modal. For example, uni-modal models may be trained on only language, while multi-modal models may be trained using text-image pairs. Remarkably, the abilities acquired by FMs demonstrate very good transferability to a wide variety of new downstream tasks, many times with very limited or no data for the target task. Since their introduction in the natural language processing (NLP) domain, FMs have been applied to uni-modal and multi-modal Vision & Language (V&L) scenarios, and have demonstrated unprecedented capabilities for high fidelity data synthesis and out of domain generalization. However, despite the progress in FMs, many gaps still remain open with regards to reaching human level performance in some mundane tasks, as well as in many human expert ones. In particular, for many types of specialized data, which are arguably of the utmost interest for many real-world applications, FM performance is still lacking in many respects due to such specialized data not being present in the web-crawled internet-scale datasets used to train FMs. Any knowledge of such specialized data may reside in the long-tail distribution of such models. In other words, such specialized data may have been encountered during training, but not very often. For example, specialized data may include illustrated technical or scientific documentation, medical and other expert domains data. In addition, even if specialized data is present, the specialized data is deep in the long-tail of the data distribution statistics. In other words, due to the limited capacity, or the information bottleneck, of the FM models, useful representation features for this specialized data are not significant in the FMs' learned representation space. Moreover, commonly, a large domain gap exists between natural image common-objects biased data used for FM training and sketch-like/synthetic/non-consumer-camera imagery commonly appearing in expert data scenarios. Therefore, to be successfully utilized for expert data applications, FMs may need to be tuned to better represent this data, driving the under-represented features that are necessary for such data to emerge.

Contrastive Language-Image Pre-Training (CLIP) is a neural network trained using a contrastive loss applied to the similarity of the textual and visual features of all image-text pairs within each batch. This simple yet effective method has proven to work well on natural images when supplied with a large amount (400 M) of image-text pairs collected from the Web. However, experiments showed that CLIP's performance on document data based expert tasks is far from sufficient. This underlines the need to fine-tune models such as CLIP on expert tasks in order to adapt the model to practical use in expert applications.

However, fine-tuning such models may not be easy. For example, in the case of the automatic document data annotation, where there are no image-text pairs but rather sets of text associated to each image and sets of images associated with each text, the original contrastive loss cannot be used as it requires pairs which are relevant to each other and it may not be known which of the texts is relevant to the image, hence learning with such data may result in very poor results. Additionally, expert data is quite diverse and significantly small compared to the tremendous volumes of pre-training data used to make CLIP.

According to embodiments of the present disclosure, a self-supervised system and method may be used for training multi-modal models on documents. The system is the combination of CLIP-MIL (combination of CLIP and MIL-NCE) and CLIP-LoRA, which is extension of LoRA. LoRA reduces the number of trainable parameters for downstream tasks while having no inference latency added. The CLIP-MIL uses image-text bags/data with MIL (Multiple Instance Learning) variants-including MIL-MAX and MIL-SoftMax. The CLIP-LoRA is characterized by adapting LoRA from language models to CLIP. We further adapted LoRA to multiple types of Neural networks architectures and expanded LoRA to work on all the network's layers. The embodiments use contrastive loss from MIL variants, inspired by methods from the video domain, instead the original contrastive loss. Moreover, the embodiments may use different constrained fine-tuning strategies based on encoder-locking to address the issue of expert data being diverse and relatively small in availability. An example system includes a processor that can automatically extract text and images from a document. The processor can automatically generate text bags including a number of nearest texts for each of the extracted images. The processor can then train a multi-modal model based on the automatically generated text bags using a CLIP-MIL loss that computes, for each of the extracted images, a correlation between each of the different texts in the texts bags using a CLIP feature space at each gradient step of the gradient descent-based multiple instance learning (MIL) algorithm. Thus, embodiments of the present disclosure enabled automated fine-tuning of a multi-modal model from automatically extracted, weakly annotated training data. Moreover, the resulting fine-tuned multi-modal model may not experience any additional latency as a result of the fine-tuning. In addition, the automatic text-image pairs extraction pipeline can fit any collection of illustrated programmatic Portable Document Format files (PDFs) or even broader documents data, making the techniques described herein easily extensible to new content domains and expert data applications drawing from this abundant source of expert V&L data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as multi-modal model trainer module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
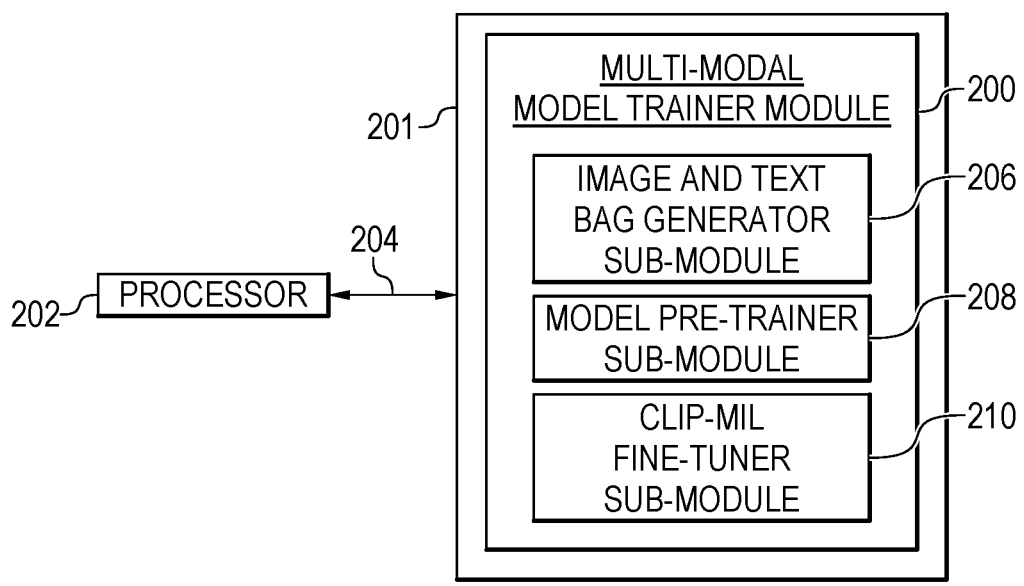
FIG. 2 is an example tangible, non-transitory computer-readable medium that can train multi-modal models using multiple instance learning.

Referring now to FIG. 2, a block diagram is depicted of an example tangible, non-transitory computer-readable medium 201 that can train multi-modal models using multiple instance learning. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300 of FIG. 3.

The various software components discussed herein may be stored on the tangible, non-transitory, computer-readable medium 201, as indicated in FIG. 2. For example, the multi-modal model trainer module 200 includes an image and text bag generator sub-module 206 that includes code to automatically generate a number of image-texts bags including number of nearest extracted texts for each extracted image from a document. In some examples, the image and text bag generator sub-module 206 also includes code to extract text-images bags including a number of nearest images for each extracted text from the document. The multi-modal model trainer module 200 includes a model pre-trainer sub-module 208 that includes code to pretrain the multi-modal model on a large set of image-text pairs. The multi-modal model trainer module 200 includes a CLIP-MIL fine-tuner sub-module 210 includes code to fine-tune an unlocked subset of parameters of a pretrained multi-modal model based on generated text bags using a CLIP-MIL loss that computes, for each extracted image, a correlation between different texts in texts bags using a CLIP feature space at each gradient step of gradient descent-based multiple instance learning (MIL) algorithm. The CLIP-MIL fine-tuner sub-module 210 also includes code to lock pretrained parameters of the pretrained multi-modal model during the fine-tuning. In various examples, the CLIP-MIL fine-tuner sub-module 210 includes code to fine-tune the multi-model model using a CLIP-MIL Max loss that selects a text with a highest correlation for each extracted image from the document. In some examples, the CLIP-MIL fine-tuner sub-module 210 includes code to fine-tune the multi-model model using a CLIP-MIL SoftMax loss or a CLIP-MIL NCE loss that calculates a weighted average between texts in each of a number of positive text bags. For example, the CLIP-MIL NCE loss may calculate normalized weights for each of the positive texts in a bag associated with an image and apply a weighted step during training based on the normalized value of each text. Thus, texts with smaller similarities may have smaller steps applied during training than texts with larger similarities. In various examples, the CLIP-MIL SoftMax loss may be used to increase the step taken by a most similar text and reduce the step size taken for less similar texts. In various examples, the CLIP-MIL fine-tuner sub-module 210 includes code to normalize the weighted average using both positive and negative texts. In some examples, the CLIP-MIL fine-tuner sub-module 210 includes code to execute a low-rank adaptation of large models (LoRA) to reduce the number of trainable parameters during fine-tuning.

It is to be understood that any number of additional software components not shown in FIG. 2 may be included within the tangible, non-transitory, computer-readable medium 201, depending on the specific application. For example, the computer-readable medium 201 may also include a retrieval module that includes code to receive a text as input at the multi-modal model and retrieve an associated image via the multi-modal model. In some examples, the retrieval module may include code to receive an image as input at the multi-modal model and retrieve an associated text via the multi-modal model.

Figure 3:
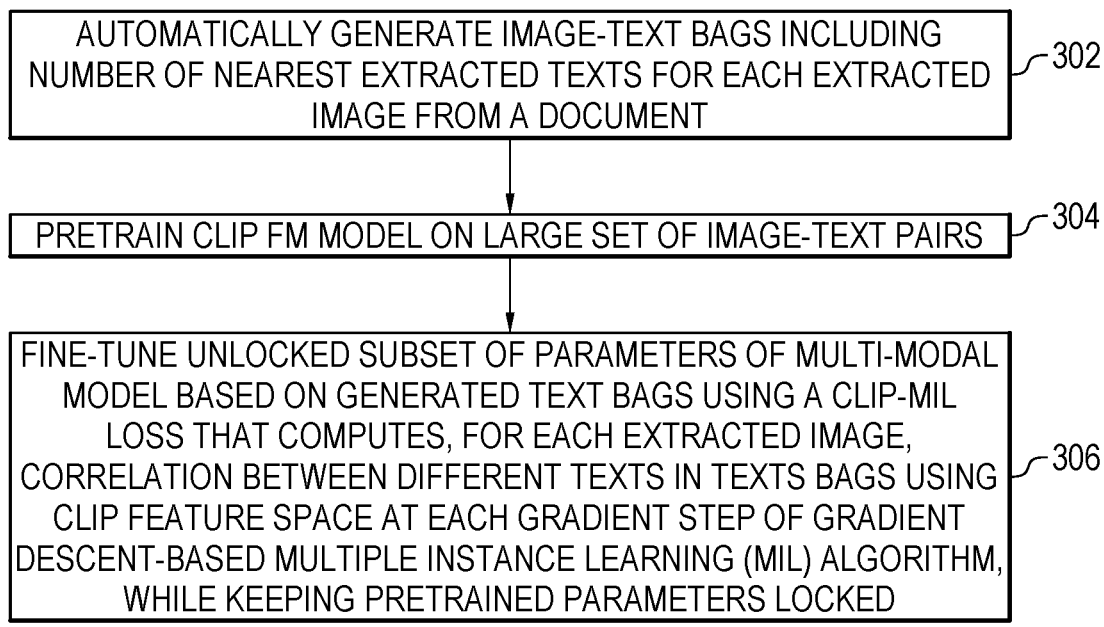
FIG. 3 is a process flow diagram of an example method that can train multi-modal models using multiple instance learning.

FIG. 3 is a process flow diagram of an example method that can train multi-modal models using multiple instance learning. The method 300 can be implemented with any suitable computing device, such as the computer 101 of FIG. 1. For example, the methods described below can be implemented by the processor set 110 of FIG. 1.

At block 302, image-text bags are automatically generated including number of nearest extracted texts for each extracted image from a document. For example, the image-text bags may include positive image-text bags and negative image-text bags. The positive image-text bags may include an image and surrounding or overlapping text. For example, each text detected to the right, left, top, or bottom of the image may be extracted and included in the image-text bag associated with a particular image. The negative image-text bags may include text that is not associated with an image. For example, the negative image-text bags may include extracted text from another page of the document that does not include the same image.

At block 304, a multi-modal model is pretrained on a large set of image-text pairs. For example, the image-text pairs may be from a large database of publicly available image-text pairs. As one example, the multi-modal model may be a CLIP FM model that is trained using 400,000,000 image-text pairs.

At block 306, an unlocked subset of parameters of a pretrained multi-modal model are fine-tuned based on generated text bags using a CLIP-MIL loss that computes, for each extracted image, a correlation between different texts in texts bags using a CLIP feature space at each gradient step of gradient descent-based multiple instance learning (MIL) algorithm. Pretrained parameters of the pretrained multi-modal model are locked during the fine-tuning. For example, a low-rank adaptation of large models (LoRA) may be executed to reduce the number of trainable parameters during fine-tuning. In some examples, a CLIP-MIL Max loss may be used that selects a text with a highest correlation for each extracted image from the document. In some examples, a CLIP-MIL SoftMax loss or a CLIP-MIL NCE loss may be used that calculates a weighted average between texts in each of a number of positive text bags. In various examples, the weighted average can be normalized using both positive and negative texts.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. In some examples, the method 300 may include executing a retrieval using the fine-tuned multi-modal model. For example, the method may include receiving a text as input at the multi-modal model and retrieving an associated image via the multi-modal model. In some examples, the method may include receiving an image as input at the multi-modal model and retrieving an associated text via the multi-modal model.

FIG. 4 is a block diagram of an example system for automatically generating image-text bags from documents. The system 400 includes a set of documents 402 shown being received at a DeepSearch optical character recognition (OCR) engine 404. The system 400 includes an image 406 and text 408 shown being extracted from the documents 402. The system 400 includes an identical image detector 410 and text merger 412 communicatively coupled to the DeepSearch OCR engine 404. The system 400 also further includes an image text matcher 414 communicatively coupled to the identical image detector 410 and the text merger 412. The image text matcher 414 is shown generating image-texts bag 416 and text-images bag 418.

As shown in FIG. 4, the system 400 provides a completely automatic pipeline for extracting images and texts from any document and outputting one-to-many image to texts and text to images bags. The traditional CLIP model uses one-to-one matching between image and text to learn, but as can be seen our documents has many images and texts in the same page, which might and might not be relevant to each other. To still manage to learn from such complex data, the system 400 can create one-to-many image-texts bags using an automatic annotation process.

In the example of FIG. 4, the automatic annotation process receives a folder of documents as input. For example, the folder of documents may be a compressed set of PDFs. Then, the DeepSearch OCR engine 404 extracts the different texts 408, cropped images 406 and their coordinates from each page. For example, downloaded documents may be processed by the DecpSearch1 tool https://ds4sd.github.io/, which extracts the images and the texts. In various examples, the extracted texts are processed to create large, consecutive chunks of texts. In some examples, bad characters artifacts created during PDF parsing are also removed. In various examples, improbable boxes and failed boxes may also be filtered.

Next, the identical images detector 410 can link information on identical images which appear in different pages. For example, car manual data may include images which reappear in several different locations within the same manual.

Since our automatic annotation links images and texts which are located in the same page, retrieving a correct image but from a different page can artificially lower the test results. As one goal is to keep the flow unsupervised as much as possible, in order to overcome this issue, the identical images detector 410 can process the images in three steps. First, we trained a self-supervised network on all the data in order to get meaningful image features. For example, the DINO network may be used to create good image representations due to its loss function which inherently produces good clusters in the embedded space. As a second step, for each image, the top ten nearest neighbors are selected in the embedded space. Lastly, Normalized Cross Correlation filtering may be performed on the selected images and images with correlation higher than t>0.7 are selected. These images may be treated as identical images during test time. For the retrieval tests, the sets of texts matching to identical images were merged (by their union), and there was no penalty when retrieving an identical image from a different page. In the experiments discussed herein, the DINO model used for identical images filtering was used only for that and not used in the experiments in any other way.

In various examples, the text merger 412 can merge short sentences into paragraphs based on location. For example, the text merger 412 can merge spatially close text boxes are together.

Finally, the image text matcher 414 matches each image with up to five texts to generate one-to-many image-texts bags 416, which can then be used for training. As in the original CLIP, the loss is two sided. The image text matcher 414 can also create one-to-many text-images bags 418, which are also used for training. The automatic annotation of system 400 performs well as indicated by manual validation that showed we found that 93 percent of the images in the data were successfully connected to related texts, as shown and described in FIG. 10.

Figure 5A:
FIG. 5A is an example page from a technical manual containing text and images.

FIG. 5A is an example page from a technical manual containing text and images. The example page 502 of FIG. 5A includes an image 504 that is to be associated with a number of nearby texts 506A, 506B, and 506C. In the example of FIG. 5A, the image 504 is of a number of window switches located at the driver's door. The corresponding description describing the operation of the window switches in a convertible model of the car is included in texts 506B and 506C, which are located directly above and underneath the image 504. Text 506A, which is located to the left of the image 504 in the example of FIG. 5, describes the operation of a replacing the battery in the vehicle.

Documents are a natural data-source to find text-image pairs, since images in documents have either captions or at the minimum are related to their surrounding textual content. In various examples, the documents can thus be processed such that all text and images are automatically extracted. In the spirit of Multiple Instance Learning (MIL), an automatic matching of each extracted image with a set of up to five pieces of texts from the same page was performed in experiments. Every image was paired with the most probable text block from the left, right, top, and bottom of the figure, when available. A text box was also selected if it was overlapping with the image. The experiments found that, in the majority of the cases, at least one of these blocks of text was related to the image. This inherently creates a many-to-many MIL scenario in which each image is associated with multiple text instances and vice-versa. Since both training and test data were automatically annotated, a small subset of the data was manually annotated in order to validate the results, as described in FIG. 10. Because the automatic annotation is based on the co-location of the image and text within the same page these cases can hurt retrieval metrics when not dealt with properly. Thus, in various examples, a filtering process may be applied to merge all occurrences of the same image within a single document, as described in FIG. 4.

Figure 5B:
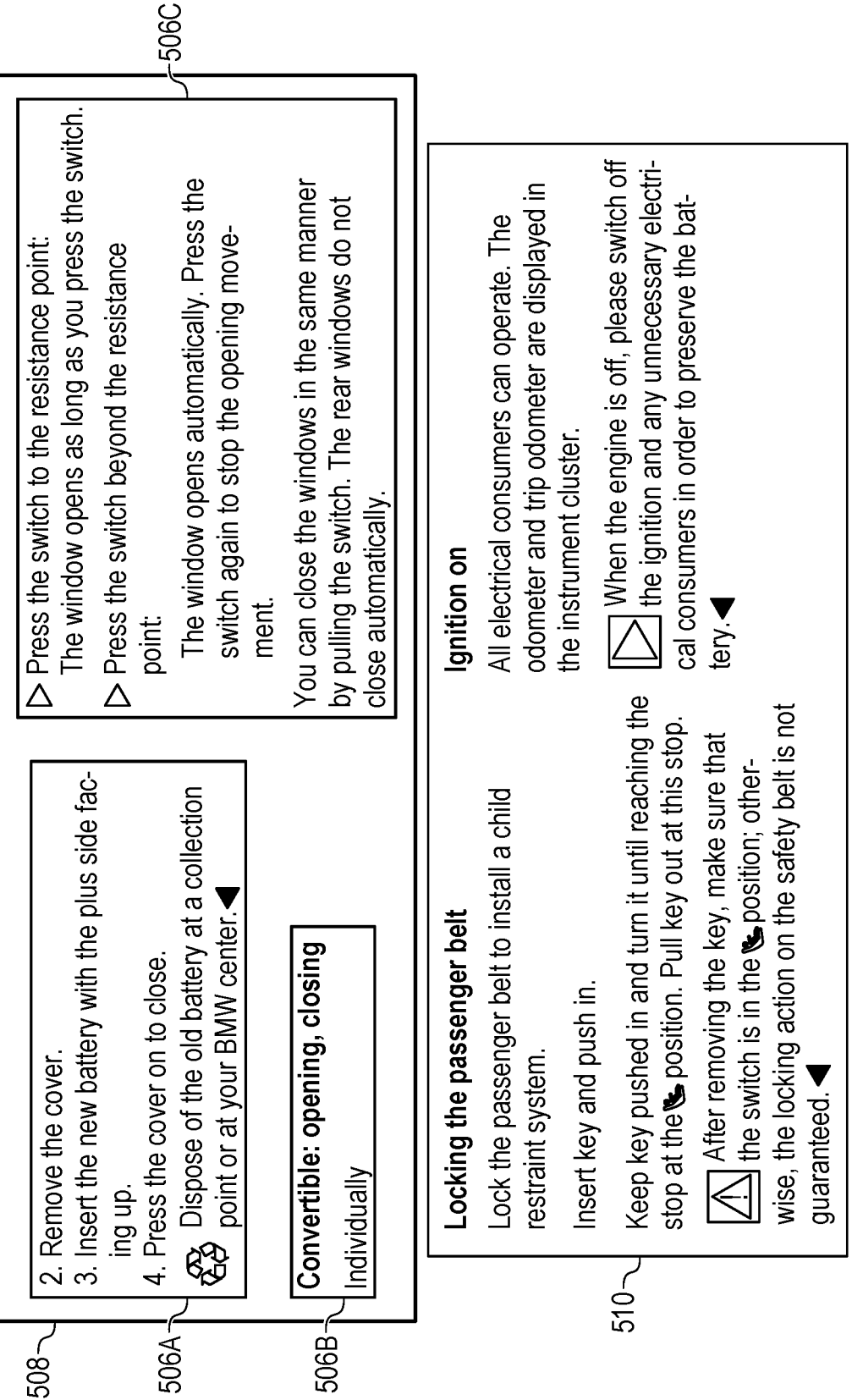
FIG. 5B is an example set of image-texts bags extracted from the technical manual.

FIG. 5B is an example set of image-texts bags extracted from the technical manual. The image-texts bags include a positive texts bag 508 extracted from the page 502 of FIG. 5A. The image-texts bags also include a negative texts bag 510 extracted from another page of the same document as page 502 of FIG. 5A. In various examples, each image in each page of a document is associated with up to five different texts. For example, the image 504 of FIG. 5A is associated to the texts from the left, above and below, extracted as texts 506A, 506B, and 506C, respectively. The texts are grouped together in the positive texts bag 508 as there is a high probability that at least one of those texts is related to the image 504. In addition, a negative text bag 510 is created using texts from other pages and is being used as negative samples in the MIL-CLIP loss described herein. In various examples, any of three loss variants may be used for Multiple Instance Learning. The various CLIP MIL losses compute the correlation between the image and the different texts using CLIP's feature space, which is actively updated during each gradient step. As one example, the CLIP MIL-Max loss only uses the mostly correlated text to each image. In the example of FIG. 5B, by the end of the training, the most related text 506C to the image 504, will have the highest correlation score to the image 504 and by that will be the only text used in the MIL-Max loss. Alternatively, in various examples, the CLIP-MIL NCE and CLIP-MIL Soft-Max losses use a weighted average between all the texts from the positive texts bag. These losses thus enable learning both from very related and from slightly related texts, such as the associated title text 506B. As one specific example, the correlation scores for the texts 506A, 506B, and 506C may be 0.55, 0.3, and 0.15, respectively.

In various examples, the negative text bag 510 may also be used by the CLIP MIL losses. For example, texts from the negative text bag 510 may be provided as candidates to be similar texts to the image, and the model may learn that those texts are not related to the image and to learn to only focus on candidates from the positive text bag. As one example, if the max score indicating an exact correlation is 1, then an example score for one of the negative texts may be around 0.005.

Figure 6:
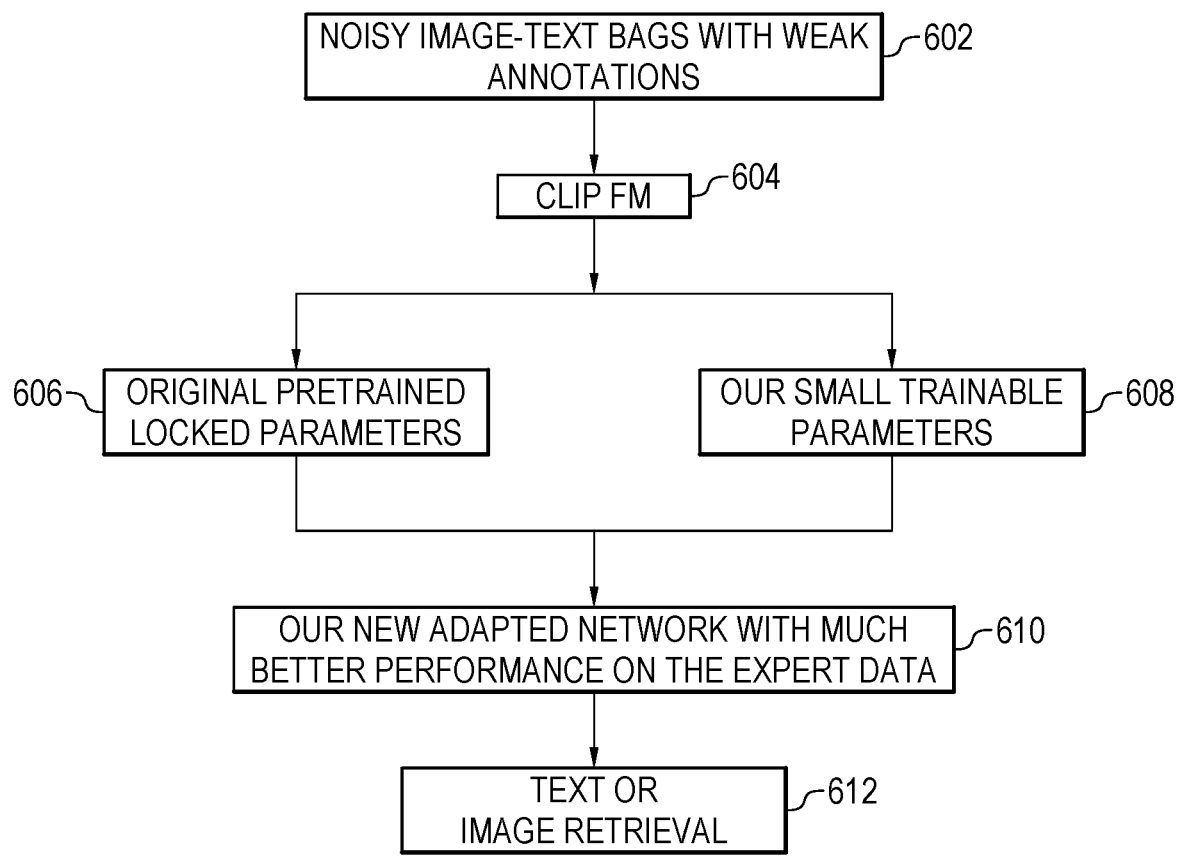
FIG. 6 is a block diagram of an example system for training multi-modal models using multiple instance learning.

With reference now to FIG. 6, a block diagram shows an example system for training multi-modal models using multiple instance learning. The example system 600 of FIG. 6 includes noisy image-text bags with annotations 602. The system 600 includes a CLIP FM model 604. For example, CLIP FM model 604 may be trained on many image-text pairs. As one example, the CLIP FM model 604 can be trained on 400,000,000 image-text pairs. In various example, the CLIP FM model 604 may have any suitable architecture. For example, the CLIP FM model 604 may use the ViT-L/14 or the ResNet50 architectures, among other suitable architectures. In experiments, using the ViT-L/14 backbone lead to higher performance as compared to ResNet50, with the CLIP-MIL variants maintaining their significant gains under the stronger ViT-L/14 backbone. The system 600 also includes an original set of pretrained parameters 606 that are locked. For example, the original pretrained parameters 606 may have been trained on the image-text pairs. The system 600 further includes a small set trainable parameters 608. For example, the trainable parameters 608 may be a small set of parameters added to one or more layers of the CLIP FM model 604. As one example, the trainable parameters may be added to each of Pytorch's nn.linear, nn.conv, nn.embedding layers. As one example, the number of trainable parameters 608 may be 32. In various examples, the trainable parameters 608 may trained using any of the CLIP-MIL variants described herein, including the MIL-Max, the MIL-SoftMax, and the MIL-NCE variants described below. The system 600 includes a resulting adapted network 601, which includes the original pretrained parameters 606 and the trainable parameters 608. The system 600 includes a text or image retrieval stage 612 performed using the adapted network 610. For example, the adapted network 610 may receive a text as input and retrieve one or more images associated with the input text. For example, the images may be retrieved from one or more technical manuals, or other sources of images. Alternatively, or in addition, the adapted network 610 may receive an image as input and retrieve one or more texts associated with the input image.

In the example of FIG. 6, the CLIP FM model 604 includes an image encoder $M_I$ and a text encoder $M_T$. For a given image $I_i$, and a piece of text $T_i$, the image and the text embedding vectors $x_i$ and $y_i$ may be defined as the outputs of $M_I$ and $M_T$, respectively:

$$x_i = M_I(I_i), \; y_i = M_T(T_i) \quad \text{Eq. 1}$$

Standard supervised learning assumes that the samples and targets are paired, $\{x_i, y_i\}_{i=1}^N$, where N is the size of the dataset. For a given batch of samples, B, the standard CLIP loss is a cross-entropy loss, which may be defined as:

$$\mathcal{L}_{CLIP} = -\frac{1}{2B}\left(\sum_i^B \log \frac{\exp(x_i^T y_i/\sigma)}{\sum_{j=1}^B \exp(x_i^T y_j/\sigma)} + \sum_i^B \log \frac{\exp(y_i^T x_i/\sigma)}{\sum_{j=1}^B \exp(y_i^T x_j/\sigma)}\right) \quad \text{Eq. 2}$$

where $\sigma$ is a normalization factor, often set as a learned parameter. In various embodiments, the above CLIP contrastive loss is modified, thus adapting the contrastive loss to a MIL setting, where at least one of the texts is a positive match to the image and vice versa. Such modified CLIP contrastive loss is referred to herein as CLIP-MIL. In particular, the MIL setting relaxes the paired assumption and defines a bag of M targets $\{y_i^m\}_{m=0}^M$ such that at least one of the targets (e.g., texts) is a positive match to the sample (e.g., an image). This weak annotation aligns perfectly with our automatic annotation framework. In various examples, the original loss of Eq. 2 may be modified to the MIL setting using alternative loss functions. For example, a simple yet effective method for MIL is referred to herein as MIL-Max. MIL-Max includes selecting the positive example as the maximum value over the bag of labels. Defining the maximally correlated text in image texts bag, and the maximally correlated image in text images bag, $\hat{m}_i = \arg\max_m x_i^T y_i^m$, the MIL-Max loss $\mathcal{L}_{MAX}$ may be calculated using the equation:

$$\mathcal{L}_{MAX} = \quad \text{Eq. 3}$$

$$-\frac{1}{B}\sum_i^B \log \frac{\exp(x_i^T y_i^{\hat{m}}/\sigma)}{\exp(x_i^T y_i^{\hat{m}_i}/\sigma) + \sum_{j\neq 1}^B \sum_m \exp(x_i^T y_j^m/\sigma)} -$$

$$\frac{1}{B}\sum_i^B \max \log \frac{\exp((y_i^q)^T x_i/\sigma)}{\exp(y_i^{qT} x_i/\sigma) + \sum_{j\neq 1}^B \sum_m \exp(y_i^{mT} x/\sigma)}$$

Alternatively, a MIL-SoftMax variant of Eq. 3 may be used. For example, a small modification may be made to the MIL-Max loss by replacing the maximum with a SoftMax weighted average of the nominator of the loss function. In some examples, the SoftMax weights may be defined with scaling factor $\sigma_{Sm}$ as:

$$S_i^m = \frac{\exp(x_i^T y_i^m/\sigma_{sm})}{\sum_{n=1}^M \exp(x_i^T y_i^m/\sigma_{sm})} \quad \text{Eq. 4}$$

and the MIL-SoftMax variant $\mathcal{L}_{SM}$ may then be calculated using the equation:

$$\mathcal{L}_{SM} = -\frac{1}{B}\sum_i^B \log \frac{\sum_m S_i^m \exp(x_i^T y_i^m/\sigma)}{\sum_m S_i^m \exp(x_i^T y_i^m/\sigma) + \sum_{j\neq 1}^B \sum_m \exp(x_i^T y_j^m/\sigma)} - \quad \text{Eq. 5}$$

$$\frac{1}{B}\sum_i^B \max \log \frac{\exp(y_i^{qT} x_i/\sigma)}{\exp(y_i^{qT} x_i/\sigma) + \sum_{j\neq 1}^B \sum_m \exp(y_i^{mT} x/\sigma)}$$

In some embodiments, a third MIL-NCE variant may alternatively be used. For example, the MIL-NCE approach was proposed for visual representation learning from uncurated videos. In various examples, the MIL-NCE loss may be adapted to fit the CLIP contrastive loss as follows:

$$\mathcal{L}_{NCE} = -\frac{1}{B}\sum_i^B \log \frac{\sum_m \exp(x_i^T y_i^m/\sigma)}{\sum_{j\neq 1}^B \sum_m \exp(x_i^T y_j^m/\sigma)} \quad \text{Eq. 6}$$

Thus, using automatically created image-texts bags and text-images bags, any of the above MIL-CLIP variants may be used to learn a meaningful image-text feature space, which has a high image-to-text and text-to-image retrieval accuracy. The resulting multi-modal model 610 may then be used to retrieved texts from input images, or images from input texts.

It is to be understood that the block diagram of FIG. 6 is not intended to indicate that the system 600 is to include all of the components shown in FIG. 6. Rather, the system 600 can include fewer or additional components not illustrated in FIG. 6 (e.g., additional or alternative locking methods, or additional models, etc.).

Figure 7:
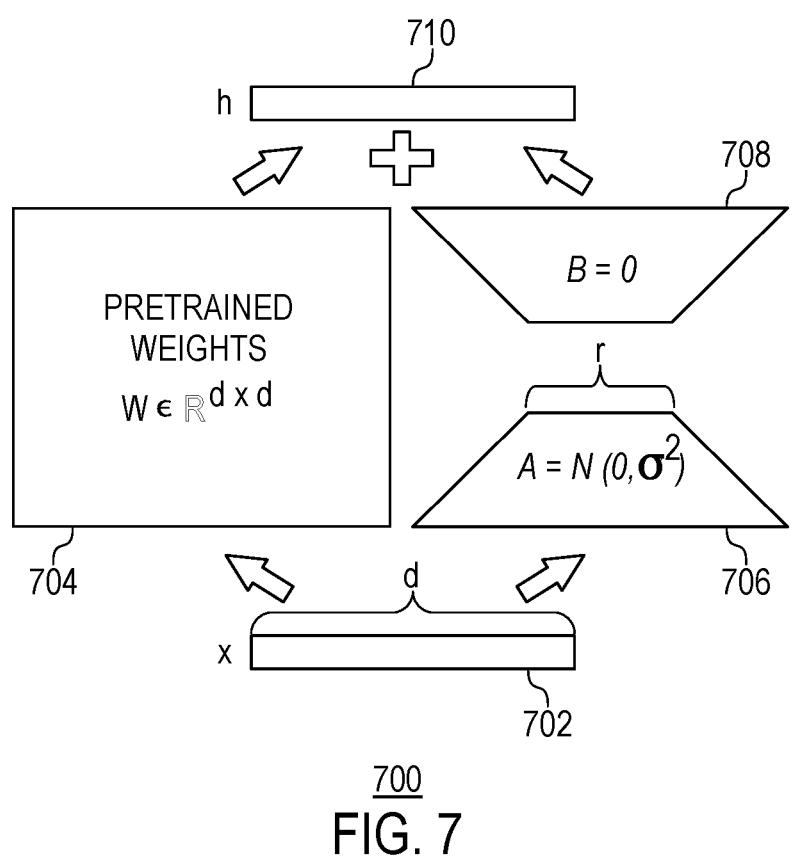
FIG. 7 is an example CLIP-Lora system for training neural networks.

FIG. 7 is an example CLIP-LoRA system for training neural networks. The example, system 700 of FIG. 7 includes input training data 702 of size d. The system 700 includes a set of pretrained weights 704. For example, the pretrained weights 704 may be of a foundational models, such as a CLIP model, trained using 400,000,000 text-image pairs. As one example, the number of pretrained weights 704 may be about 2000. The system 700 further includes a matrix 706 and matrix 708. For example, the matrices 706 and 708 may be trainable rank decomposition matrices. As shown in FIG. 7, matrices 706 and 708 may have trainable parameters that are initialized using a random Gaussian initialization and zero, respectively. As one example, the number of trainable parameters may be about 32. The system 700 also further includes a set of outputs 710. For example, the outputs 710 may be used during training as inputs to a next layer and the matrices 706 and 708 updated using gradient descent or any other suitable method. At inference, the outputs 710 may similarly be input into another layer and eventually used to make a prediction. As one example, the output values 710 may be generated based on values of the 2032 parameters, including the 2000 pretrained parameters and 32 trainable parameters. For example, the 32 parameters of matrices 706 and 708 may be trained on a much smaller data set, such as a specialized data set including 50,000 samples.

The system 700 of FIG. 7 is a LoRA adapted for use with CLIP. LoRA allows training of some dense layers in a neural network indirectly by optimizing rank decomposition matrices of the dense layers' change during adaptation instead, while keeping the pre-trained weights 704 frozen. In particular, LoRA was adapted from use with LMs to use with CLIP by changing each linear layer, convolutional layer, and embedding layer to a LoRA layer of the same kind. In addition, the LoRA of system 700 is adapted from using transformers to using ResNets. In particular, each of the linear layers, convolutional layers, and embedding layers of the ResNet have been adapted to a LoRA layer. For example, an additional 32 trainable parameters may have been added to each of the each of the linear layers, convolutional layers, and embedding layers of the ResNet. Finally, the LoRA of system 700 was modified from adapting only multi-head self-attention (MHSA) blocks to adapting the entire network. In particular, the layers of the backbone of the network are also adapted using the system 700. The LORA system 700 can thus be used with the techniques described herein to greatly reduce the number of trainable parameters for downstream tasks, while having no inference latency added.

FIG. 8A is a table 800A of results of various experiments performed with CLIP-MIL to show the performance of CLIP-MIL in general. The CLIP row shows a baseline set of results for comparison. The experimental code used was based on the open source project Open Clip. An extension to the CLIP contrastive loss, adapting the CLIP contrastive loss to a MIL setting, where it is known that at least one of the texts is a positive match to the image and vice versa. The MIL setting relaxes the paired assumption and defines a "bag" of M targets such that at least one of the targets (e.g. texts) is a positive match to the sample (e.g. image). This weak annotation aligned perfectly with the automatic annotation framework described herein.

In particular, the experiments performed used workshop service car manuals dataset published in FETA. The dataset contained 349 car service manuals from https://www.workshopservicemanual.com/and contained an average of 149 pages per document. The documents were then processed such that all text and images were automatically extracted. The Car-Manuals dataset included of a total of 349 PDF documents from five car manufacturers. Each document had a size in the range of 20 to 1602 pages. In all of the experiments, the data was split into five parts, one part for each manufacturer. In addition, the data for each manufacturer was split into five folds, the results presented are calculated using two averages: a first average for each manufacturer over the results for the five different folds, then a second average of those results across the five manufacturers. The folds were splitting on complete documents, not on document pages, so pages from the same document never appeared in both train and test sets. A detailed set of baseline experiments were first performed under four different settings. The settings included a Many-Shot setting in which training was performed on four folds of a first manufacturer that contained the largest collection of documents (approximately 200), and testing was performed on the remaining fifth fold. The settings included a Zero-Shot setting in which training was performed on all data of all but one manufacturer, and testing was performed on all the data of the left-out manufacturer. The settings included a One-shot setting in which training was performed similar to Zero-Shot but adding one document of the left-out manufacturer, and testing was performed on the remaining data of the left-out manufacturer, which was repeated five times with a different document each time. The settings also further included a Few-shot setting in which training was similar to One-Shot setting but added one fold of the left-out manufacturer, and testing was performed on the remaining folds of the left-out manufacturer, which was repeated five times with a different document each time. Approximately 18 documents were used in the few-shot setting. In general, all MIL variants were trained for 20 epochs. However, this resulted in overfitting for the Zero-Shot and Few-Shot settings of the car manuals data. Thus, these two settings were trained with only two epochs, which were found to yield the best results.

A top one, top 5, and top 10 result retrieval accuracy rate is shown for each, indicating the percentage of times that the true result was retrieved from thousands of images or texts in the top one, top 5, or top 10 results retrieved. The "Locked" column refers to versions trained with locked (frozen) parameters of the image encoder $M_I$. Numbers in bold indicate the best results. In this manner, Image-to-text and text-to-image retrieval within each document and average across all documents was tested. The CLIP-MIL techniques achieved a consistent performance boost above the baselines in all 4 different settings. Notably, a 25 percent accuracy increase was achieved in the Many-shot setting, as indicated by an arrow.

The empirical results shown in table 800A support several conclusions. First, the CLIP model under-performs with respect to all the fine-tuning methods in the Zero-Shot and other settings, strengthening the hypothesis that FMs indeed need to be fine-tuned for expert domain (practical) applications such as explored in FETA, and their massive-scale pre-training is not sufficient for these tasks on its own. Second, fine-tuning using automatically collected V&L annotations induces significant performance improvements in many cases, especially in the Many-Shot case. Moreover, the Many-Shot case is arguably the most practical scenario because the annotations are automatic, hence the training data can scale easily with adding more documents. This further highlights the benefit of automatic annotation pipeline proposed in FETA for supporting low annotation cost adaptation of V&L models to expert domains defined by corpora of documents with illustrations. Third, training with the MIL paradigm consistently boosted performance with respect to other (non-MIL) baselines indicating the utility of using MIL and its variants. Fourth, the locked image encoder variants demonstrate interesting trade-offs with unlocked ones in different scenarios. This was further evaluated this in a more thorough ablation study of this aspect, as discussed with respect to FIG. 9. In various examples, intermediate locking options using low-rank residual adapters tuning may thus be used.

FIG. 8B is a table of results of various experiments performed with various CLIP-MIL variants to show the performance of different types of CLIP-MIL. The table 800B shows Image-to-Text and Text-to-Image retrieval accuracy for three MIL fine-tuning baseline variants under two different data-split settings. The table 800A of FIG. 8A shows a comparison of the performance of three CLIP-MIL variants, compared to SOTA foundation models, the original CLIP 400 M, FLAVA, Vision-and-language transformer without convolution or region supervision (ViLT) first introduced in 2021, and Align before fuse: Vision and language representation learning with momentum distillation (AL-BEF) first introduced 2021. Several methods were used to modify the original loss to the MIL setting. In particular, the MIL based losses included a MIL-MAX loss that selected the positive example as the maximum value over the bag of labels, a MIL-Softmax loss that included a small modification to the MIL-Max loss by replacing the maximum with a Softmax weighted average of the nominator of the loss function, and an adapted MIL-NCE loss to fit the clip contrastive loss. A top one, top 5, and top 10 result retrieval accuracy rate is shown for each, indicating the percentage of times that the true result was retrieved from thousands of images or texts in the top one, top 5, or top 10 results retrieved. In the example of FIG. 8B, only Many-Shot and Few-Shot experimental settings are included because they are the more practical settings. Again, the "Locked" column refers to versions trained with locked (frozen) parameters of the image encoder $M_I$. Similarly, numbers in bold indicate the best results. As can be seen, the CLIP-MIL-NCE variant tended to perform the best, particularly with multiple samples retrieved and in the many-shot setting.

FIG. 9 is a table of results of various experiments performed with CLIP-LoRA. Table 900 explores different variants of locking the model parameters during MIL finetuning. In particular, CLIP 400 M network was finetuned while locking different parts of the network. Various tests included locking the image encoder, the text encoder, or both excluding the text projection layers (Locked*) and the use of Low-Rank Adapters (LoRA). LoRA was used to interpolate between the Unlocked (rank r=512) and the Locked Image (rank r=0) variants. The interpolation between the Unlocked and the Locked Image variants was shown by changing the rank of the added residual adapters weight matrices. This exploration clearly shows the trade-offs between locking and unlocking the image encoder MI, with up to 2.1% relative improvements in some cases. Similar to FIG. 8, numbers in bold indicate the best results.

As shown in table 900 of FIG. 9, LoRA showed better fine tune capabilities in large language models by freezing weights of original layers and adding new residual adapters weight matrices to each component. In particular, the performance of our CLIP-MIL-NCE method was evaluated under several parameter-locking as well as "intermediate" states. Locked parameters are parameters that do not change during training. The five different options tested were: (i) Unlocked: Let both $M_I$ and $M_T$ train during fine-tuning. (ii) Locked Image: Lock $M_I$ and only let $M_T$ train. (iii) Locked Text: Lock $M_T$ and only let $M_I$ train. (iv) Locked*: Lock both $M_I$ and $M_T$ except the last "text projection" layer in $M_T$. (v) Finally we adapt to V&L model use the Low-Rank Adapters (LoRA) based method that allows us to interpolate between the Unlocked (rank r=512) and the Locked Image (rank r=0) variants by changing the rank of the added residual adapters weight matrices. LoRA was adapted from LMs to CLIP, from transformers to ResNet, and, as opposed to the original LoRA that only adapts the MHSA blocks, the entire network was adapted. Table 900 clearly shows the trade-offs between locking and unlocking the image encoder $M_I$, with up to 3.6% relative improvements in some cases. Further significant improvements were demonstrated by using low-rank intermediate variants, with up to 2-3% additional improvement. No parameters were added, as these adapters are only used for training and are fully collapsed into the model parameters at inference time. Thus, some adaptation to the full model can help. Finetuning a large model such as CLIP 400 M to a relatively small dataset is a delicate task and the number of trainable parameters is a key factor in adapting the model. By using CLIP-LoRA, the interpolation between training a completely unlocked CLIP to locking the entire image or text encoders was shown. Using 32 parameters as the number of trainable parameters increased many-shot performance by up to 4 percent.

FIG. 10 is a table of results of a validation of the techniques described herein performed using manually annotated data. In particular, a subset of the documents was manually annotated in order to validate the results that were obtained on automatically annotated data in FIGS. 8 and 9. For this manually annotated set, 15 documents were randomly selected, making sure to select at least two documents from each manufacturer, and a single image manually paired with a single text within every page of each document. Up to 50 images per document were manually selected and manually generated (by a human expert) the image description using the information on the page as technical reference. The manual annotation was done using the annotation tool of the DeepSearch cloud service, based on the automatic extraction of images and texts. This annotation was used to both validate the test results obtained on the automatically curated data and demonstrate that pre-training on automatically curated data indeed improves results on manually annotated data. As can be seen from FIGS. 8 and 10, the results on the automatic and manual annotated set are highly correlated, thus strengthening the validity of the automatic annotation for testing, and underlining the scalability of the techniques described herein in terms of adding data and future inclusion of additional expert domains. In particular, when running the same image to text and text to image retrieval experiment on the manually annotated data, the CLIP-MIL and baselines show the exact same trend and big boosts for all 4 settings of zero, one, few and many shot. Thus, the quality of the automatic annotation process described herein was validated.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
 a processor set;
 one or more computer-readable storage media; and
 program instructions stored on the one or more computer-readable storage media to cause the processor set to perform operations comprising:
  automatically extracting text and images from a document;

automatically generating positive text bags comprising a plurality of collocated texts for each of the extracted images in the document;

automatically generating negative text bags comprising a plurality of collocated texts for extracted images in other documents; and training a multi-modal model based on the automatically generated positive text bags using a Contrastive Language-Image Pre-Training (CLIP) multiple instance learning (MIL) loss that computes, for each of the extracted images, a correlation between each of the texts in the positive text bags using a CLIP feature space at each gradient step of a gradient descent-based MIL algorithm, wherein the CLIP-MIL loss uses negative text bags and a MIL-Softmax loss function that comprises an average weighted by similarity over each positive text bag.

2. The computer system of claim 1, wherein the CLIP-MIL loss comprises a MIL-MAX loss function that selects a text with maximal similarity from each positive text bag associated with an image.

3. The computer system of claim 1, wherein the average is normalized using both positive text matches and negative text matches.

4. The computer system of claim 1, wherein the CLIP-MIL loss comprises MIL-NCE loss with a function is adapted to a CLIP contrastive loss using the image text matches and text images positive match bags and negative match bags.

5. The computer system of claim 1, wherein the operations further comprise executing a low-rank adaptation of large models (LoRA) to fine-tune the multi-modal model by reducing a number of trainable parameters during training.

6. The computer system of claim 5, wherein the LoRA is adapted to work on a residual neural network (ResNet) of the multi-modal model, wherein each of a linear layer, a convolutional layer, and an embedding layer of the ResNet is adapted into a LoRA layer by a addition of a set of trainable parameters.

7. The computer system of claim 5, wherein the LoRA is applied to all layers of the multi-modal model.

8. The computer system of claim 1, wherein the processor is to train the multi-modal model using image-texts bags comprising an image and a plurality of associated proximate texts.

9. The computer system of claim 1, wherein the operations further comprise training the multi-modal model using text-images bags comprising a text and a plurality of associated images.

10. A computer-implemented method, comprising: automatically generating a plurality of positive image-texts bags including number of collocated extracted texts for each extracted image from a document;

automatically generating negative text bags comprising a plurality of collocated texts for extracted images in other documents; and fine-tuning an unlocked subset of parameters of a pretrained multi-modal model based on generated positive text bags using a Contrastive Language-Image Pre-Training (CLIP) multiple instance learning (MIL) loss that computes, for each extracted image, a correlation between different texts in positive text bags using a CLIP feature space at each gradient step of gradient descent-based MIL algorithm, wherein pretrained parameters of the pretrained multi-modal model are locked during the fine-tuning, wherein the CLIP-MIL loss uses negative text bags and a MIL-Softmax loss function that comprises an average weighted by similarity over each positive text bag.

11. The computer-implemented method of claim 10, further comprising pretraining the multi-modal model on a large set of image-text pairs.

12. The computer-implemented method of claim 10, wherein fine-tuning the unlocked subset of parameters comprises using a CLIP-MIL Max loss that selects a text with a highest correlation for each extracted image from the document.

13. The computer-implemented method of claim 10, wherein fine-tuning the unlocked subset of parameters comprises using a CLIP-MIL NCE loss that calculates a weighted average between texts in each of a plurality of positive text bags.

14. The computer-implemented method of claim 13, comprising normalizing the weighted average using both positive text matches and negative text matches.

15. The computer-implemented method of claim 10, wherein fine-tuning the unlocked subset of parameters comprises executing a low-rank adaptation of large models (LoRA) to reduce a number of trainable parameters during fine-tuning.

16. The computer-implemented method of claim 10, comprising receiving a text as input at the multi-modal model and retrieving an associated image via the multi-modal model.

17. The computer-implemented method of claim 10, comprising receiving an image as input at the multi-modal model and retrieving an associated text via the multi-modal model.

18. A computer program product comprising:
one or more computer-readable storage media; and
program instructions stored on the one or more computer-readable storage media to perform operations comprising:
automatically generate a plurality of positive image-texts bags including number of collocated extracted texts for each extracted image from a document;
automatically generating negative text bags comprising a plurality of collocated texts for extracted images in other documents; and
fine-tuning an unlocked subset of parameters of a pretrained multi-modal model based on generated positive text bags using a Contrastive Language-Image Pre-Training (CLIP) multiple instance learning (MIL) loss that computes, for each extracted image, a correlation between different texts in positive text bags using a CLIP feature space at each gradient step of gradient descent-based MIL algorithm, wherein pretrained parameters of the pretrained multi-modal model are locked during the fine-tuning, wherein the CLIP-MIL loss uses negative text bags and a MIL-Softmax loss function that comprises an average weighted by similarity over each positive text bag.

19. The computer program product of claim 18, wherein the operations further comprise pretraining the multi-modal model on a large set of image-text pairs.

\* \* \* \* \*